United States Patent [19]

Arcella et al.

[11] Patent Number: 4,745,165

[45] Date of Patent: May 17, 1988

[54] PROCESS FOR THE PREPARATION OF CURABLE FLUOROELASTOMERS AND PRODUCTS SO OBTAINED

[75] Inventors: Vincenzo Arcella, Novara; Giulio Brinati, Milan; Piergiorgio Bonardelli, Brescia; Giulio Tommasi, Milan, all of Italy

[73] Assignee: Ausimont S.p.A., Milan, Italy

[21] Appl. No.: 882,724

[22] Filed: Jul. 7, 1986

[30] Foreign Application Priority Data

Jul. 8, 1985 [IT] Italy ................. 21472 A/85

[51] Int. Cl.$^4$ ................. C08F 16/24; C08F 2/00
[52] U.S. Cl. ................. 526/247; 526/206; 526/250; 526/255
[58] Field of Search ............... 526/206, 250, 255, 247

[56] References Cited

U.S. PATENT DOCUMENTS

| | | | |
|---|---|---|---|
| 3,787,379 | 1/1974 | Ferren et al. | 526/206 |
| 3,925,339 | 12/1975 | Ishii et al. | 526/206 |
| 4,000,356 | 12/1976 | Weisgerber et al. | 526/206 |
| 4,027,086 | 5/1977 | LoValvo et al. | 526/79 |
| 4,123,603 | 10/1978 | Stewart, Jr. | 526/254 |
| 4,166,165 | 8/1979 | Hisasue et al. | 526/206 |
| 4,275,226 | 6/1981 | Yamabe et al. | 558/142 |
| 4,361,678 | 11/1982 | Tatemoto et al. | 528/374 |
| 4,474,700 | 10/1984 | Krespan | 558/440 |
| 4,529,759 | 7/1985 | Ojakaar | 525/326.3 |
| 4,564,662 | 1/1986 | Albin | 526/247 |

Primary Examiner—Joseph L. Schofer
Assistant Examiner—N. Sarofim
Attorney, Agent, or Firm—Stevens, Davis, Miller & Mosher

[57] ABSTRACT

Process for the preparation of curable fluoroelastomers comprising reacting form 35 to 80 mol % of vinylidene fluoride, from 15 to 35 mol % of hexafluoropropene, from 0 to 30 mol % of another comonomer selected from fluoroolefins and/or perfluorovinyl ethers and from 0.01 to 1 mol % of a brominated fluorovinyl ether having general formula:

$$CF_2Br-(R_f)_n-O-CF=CF_2$$

wherein $R_f$ is a fluorinated alkylene radical containing from 1 to 9 carbon atoms and n can be either 0 or 1, in the presence of a known polymerization initiator for fluoroelastomers, and of small amounts of a chain-transfer agent having general formula:

$$R-(CF_2Br)_m$$

wherein m is either 1 or 2; when m is 1, R can be either bromine or a perfluoroalkyl radical of 2 to 4 carbon atoms containing a bromine atom bonded to a secondary carbon atom; and when m is 2, R is an alkylene radical of up to 4 carbon atoms containing a brominea-tom bonded to a secondary carbon atom.

9 Claims, No Drawings

PROCESS FOR THE PREPARATION OF CURABLE FLUOROELASTOMERS AND PRODUCTS SO OBTAINED

BACKGROUND OF THE INVENTION

1. Field of the Invention

The present invention relates to a process for the preparation of curable fluoroelastomers, and to the products so obtained.

Fluoroelastomers, and in particular fluoropolymers on the basis of vinylidene fluoride, hexafluoropropene and other monomers, such as vinyl fluoride, tetrafluoroethylene, and so forth, can be used in several fields thanks to their properties of very good chemical and heat resistance, and to their characteristic of withstanding weathering and of having optimum stability to light.

Such products can be subdivided into two groups, viz. those belonging to high molecular weight polymers, and those belonging to medium-low molecular weight polymers.

The products belonging to the first class are mainly used to prepare poured sheets, to produce coatings adherent to metal surfaces, or in general, for compression moulding.

The products belonging to the second class are very suitable to be used in thermoforming processes, such as the injection moulding or extrusion processes.

It is clear that the molecular weight distribution depends on the type of polymerization process, and on the corresponding reaction conditions; for example, the polymerization of such monomers as those hereinabove mentioned, in aqueous emulsion, in the presence of water-soluble initiators, and at temperature comprised within the range of from 40° to 50° C., yields as a rule a high molecular weight fluoropolymer, having a molecular weight distribution unsuitable for use in thermoforming processes.

2. Prior Art

Various methods have been proposed for reducing the molecular weights of fluoropolymers polymerized in aqueous emulsion, among these, the method consisting in using higher reaction temperatures, or an amount of free-radical initiator greater than the strictly necessary.

Such systems have been proved to be not much valid, both because regulating the distribution of molecular weights is difficult, and because side effects occur, which impair the heat stability of the end product.

Due to such reasons, the only valid method to be able to regulate and keep at medium-low values the molecular weight of fluoropolymers has been the use of suitable chain-transfer agents during the reaction step.

Also in this case drawbacks have to be faced, because some of these products tend to inhibit the polymerization reaction, by slackening the reaction kinetics; other products are active in particular processes only, e.g., in high-pressure processes; still others tend to interfere, during the polymerization, with vinylidene fluoride.

Bromine- or iodine-based chain regulators have been finally proposed, which have succeded in allowing the molecular weights to be regulated without causing such drawbacks as those described above.

It is however important to realize that, in the particular case of fluoroelastomers, the thermoforming is not the only problem to be faced, because for such products also having high characteristics and chemical-physical properties is important in view of the end uses they are intended for.

Fluoroelastomers indeed, as cured by processes of peroxy type, are known in technical literature because they are widely used in the industrial world thanks to their properties of high heat stability and of chemical resistance, also at high temperature.

Due to these characteristics, they are used in particular applications, above all in contact with organic and inorganic fluids characterized by high chemical aggressivity and under severe temperature conditions.

Application examples can be membranes for pumps for particular liquids, such as the membranes for fuel pumps for internal combustion engines, valve seats, non-return valves, flexible hoses, gaskets, and in particular gaskets of the oil gasket type etc.

In all these cases, fluoroelastomers are esteemed because they associate to their properties of chemical and heat, resistance the possibility of being processed in an easy way, e.g., by extrusion, and with more or less complex shapes and profiles of the end manufavture, whatever it may be.

Besides this, these products, to be able to be used in industrial applications, must also display good mechanical properties, above all when reference is made to the ultimate tensile strength, modulus, ultimate elongation, etc.

In general, therefore, fluoroelastomers have to be materials having characteristics of chemical-thermal resistance, mechanical strength and properties of machinability and/or processability as high as possible.

THE PRESENT INVENTION

A process has been found now by the applicant which allows fluoroelastomers easily processable and having high mechanical properties and chemical-thermal resistance characteristics, in the cured state, to be achieved.

The process of the present invention, for the preparation of curable fluoroelastomers, comprises reacting from 35 to 80 mol of vinylidene fluoride, from 15 to 35 mol % of hexafluoropropene, from 0 to 30 mol % of another comonomer selected from fluoroolefins and/or perfluorovinyl ethers and from 0.01 to 1 mol % of a brominated fluorovinyl ether having general formula;

$$CF_2Br-(R_f)_n-O-CF=CF_2 \tag{1}$$

wherein $R_f$ is a fluorinated alkylene radical containing from 1 to 9 carbon atoms and n can have a value of either 0 or 1, in the presence of a polymerization initiator for fluoroelastomers, and of a chain-transfer agent having general formula:

$$R-(CF_2Br)_m \tag{2}$$

wherein m is either 1 or 2; when m is 1, R can be either bromine or a perfluoroalkyl radical of 2 to 4 carbon atoms containing a bromine atom bonded to a secondary carbon atom; and when m is 2, R is an alkylene radical of up to 4 carbon atoms containing a bromine atom bonded to a secondary carbon atom.

The amount of chain-transfer agent of general formula (2) can vary from 0.001 to 1 mol %, referred to the total amount of components.

Among the chain-transfer agents of general formula (2), in the practical embodiment of the present invention $CF_2Br_2$ is preferred.

The brominated chain-transfer agents of formula (2) allow, as compared to the other brominated chain-transfer agents known, the possibility of the occurrence of branching during polymerization to be kept to the very minimum.

In fact, it has been experimentally found by the Applicant that the different bromine-containing fluorinated compounds, used as chain-transfer agents in fluoroelastomer preparation, show different behaviours. In particular, the Applicant has found that all fluorinated compounds containing at least two bromine atoms bonded to one single primary carbon atom, or at least one bromine atom bonded to a secondary or tertiary carbon atoms, are active as chain-transfer agents. To the contrary, the fluorinated compounds containing bromine exclusively as —$CF_2Br$ groups have a very reduced activity.

To illustrative purposes, the Applicant has carried out polymerizations of the monomers indicated above in the presence of the following chain-transfer agents: $CF_2Br_2$, $CF_3$—$CFBr_2$, $CBr_4$, $CF_3$—$CFBr$—$CF_2Br$ and $CF_2Br$—$CF_2Br$; and has found that the first four compounds have given a very high decrease in Mooney-viscosity of fluoroelastomer relatively to that obtained in the presence of the fifth compound or in the absence of any chain-transfer agents. The second and third chain-transfer agents give rise to fluoroelastomers which contain in their polymer chain also bromine atoms which, in their turn, are capable to cause further branching to occur. The presence of bromine atoms in the polymer chain can be obtained also when such brominated co-monomers as $CF_2=CFBr$ are used. In this case too during the polymerization the branching occurs: in fact, the N.M.R. analysis of $^{19}F$ at 188.22 MHz, carried out on Varian XL-200 spectrometer, evidences the presence of —$CF_2$—$CF_2Br$ and —$CH_2$—$CF_2Br$ groups in amounts comparable in that contained in the comonomer introduced. The presence of these groups demonstrates clearly that during the polymerization a large amount of bromine has given chain transfer, with consequent branching.

As a confirmation thereof, the fluoroelastomer obtained by using $CF_2=CFBr$ as comonomer is poorly soluble in the solvents known for fluoroelastomers.

According to the process of the present invention, with vinylidene fluoride and hexafluoropropene other comonomers in amounts of from 0 to 30 mol % can be copolymerized.

Such other comonomers can be fluoroolefins, such as tetrafluoroethylene, chlorotrifluoroethylene, vinyl fluoride, etc., and/or perfluorovinyl ethers such as perfluoromethylvinyl ether, perfluoroethylvinyl ether, perfluoropropylvinyl ether, etc.

The brominated fluorovinyl ethers of general formula (1) are products known from technical literature, and can be obtained according to any processes, in particular according to the process as disclosed in U.S. Pat. No. 4,275,226.

Among these, $CF_2Br$—$CF_2$—O—$CF=CF_2$ is preferred.

The reaction of copolymerization can be carried out by methods knows from technical literature, such as, e.g., the one described, in Kirk Othmer, Encyclopedia of Chemical Technology, vol. 8, pages 500-foll., 1979.

This is a copolymerization reaction in aqueous emulsion, carried out in the presence of a free-radical initiator, selected among inorganic peroxides, such as ammonium persulphate and potassium persulphate; redox systems, such as persulphate-bisulphite, iron-persulphate; organic peroxides, as benzoylperoxide, dicumylperoxide, bis(4-tert. butylcyclohexyl) peroxydicarbonate, di-tert.butylperoxide, di-isopropylperoxydicarbonate, diethylhexylperoxydicabonate, acetyl-cyclohexylsulphonylperoxide, tert-butylperoxypivalate, 2,4-dichloro-benzoylperoxide, isobutylperoxide, octanoylperoxide; fluorinated peroxides, fluorinated peranhydrides, etc.

Any type of known fluorinated emulsifier can be used in the process of the present invention, such as, e.g., the soaps of fluorinated carboxy acids.

The reaction is carried out at a temperature comprised within the range of from 40° to 150° C., and under a pressure of up to 10 MPa.

The curable fluoroelastomer obtained according to the process of the present invention is novel as well; a further object of the present invention in hence a curable brominated fluoroelastomer constituted;

(A) by 35 to 80 mol % of units deriving from vinylidene fluoride monomers;

(B) by 15 to 35 mol % of units deriving from hexafluoropropene units;

(C) by 0 to 30 mol % of units deriving from monomers selected among fluoroolefins and/or perfluorovinyl ethers;

(D) by 0.01 to 1 mol % of units deriving from monomers of a brominated fluorovinyl ether having general formula:

$$CF_2Br—(R_f)_n—O—CF=CF_2$$

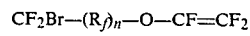

wherein $R_f$ is a fluorinated alkylene radical containing from 1 to 9 carbon atoms and n can have a value of either 0 or 1; wherein bromine is exclusively contained as —$CF_2Br$ groups and/or, even if in smaller amounts, as —$CH_2Br$ groups.

The fluoroelastomer of the present invention is characterized in that it does not contain bromine atoms bonded in polymer chain to secondary carbon atoms. This absence minimizes the possibility of polymer branching during the polymerization step, and renders fluoroelastomer soluble in the known solvents for fluoropolymers and better processable.

The fluoroelastomer of the present invention can be cured by crosslinking agents, such as, e.g., peroxy organic compounds in combination with bridging agents such as, e.g., triallylisocyanurate.

The operating conditions of curing step are substantially among those usually adopted for fluoropolymers and/or fluoroelastomers, as described in Kirk Othmer, ibid.

As examples of peroxy organic compounds 2,5-dimethyl-2,5-di-(tert. butylperoxide)hexane and the corresponding derivative of 3-hexyne can be mentioned.

In the curing process, adding to the copolymer the usual additives for this kind of processes is possible, such as, e.g., metal oxides of magnesium oxide and/or lead oxide type; metal hydroxides, such as calcium hydroxide; other fillers, such as carbon black, dyes, antioxidizers, stabilizers, etc.

The fluoroelastomer disclosed in the present invention has optimum processability characteristics which make it particularly suitable to thermoforming processing of calendering, extrusion and injection moulding type, also when complex profiles and shapes are to be obtained.

Furthermore, the corresponding cured copolymer or manufacture has very good characteristics of chemical-thermal resistance, very high mechanical properties, and optimum compression set.

To the purpose of better understanding the present invention and of describing a practical embodiment thereof, hereunder an illustrative, not limitative Example is given.

EXAMPLE

A polymerization in aqueous emulsion is carried out in a 5-1 autoclave containing 3.5 l of water, at 80° C. and under a pressure of 1.8 Mpa, by continuously feeding a gaseous monomer mixture containing 50% by vol. of vinylidene fluoride, 24.8% of perfluoropropene, 24.8% of tetrafluoroethylene and 0.4% of ethylbromovinyl ether ($CF_2BrCF_2OCFCF_2$).

As the initiator, ammonium persulphate (8 g), and as chain-transfer agent, $CF_2Br_2$ (5.3 g) is used. The polymerization is discontinued after 70 minutes. The emulsion is discharged and is coagulated by an aqueous solution containing 5 g/l of $Al_2(SO_4)_3 \cdot 8H_2O$. The product is isolated, washed with water and oven-dried at 60° C. for 24 hours. 1400 g is obtained of polymer having the same composition as of the monomer mixture used as the starting product, Viscosity Mooney 1+4 at 100° C. (ASTM D1646) of 63 and intrinsic viscosity, in methylethylketone, at 30° C., of 0.45.

The sample is compounded in cylinder mixer using the following curing formulation:

| Fluoroelastomer | parts by weight | 100 |
|---|---|---|
| Luperco 101XL (1) | " | 3 |
| Triallylisocyanurate | " | 3 |
| MgO | " | 5 |
| MT Black | " | 30 |
| Carnauba wax | " | 1 |

(1) Luperco consists of 2,5-dimethyl-2,5-di-tert.butylperoxide)-hexane.

The polymer thus formulated is examined on Monsanto Rheometer according to ASTM D 2705 at 180° C., arc 5, 100 Hz, without preheating, the following results being obtained:

| Minimum torque | 14 | |
|---|---|---|
| Ts 10 | | 1 minute and 36 seconds |
| Ts 50 | | 3 minutes and 24 seconds |
| Maximum torque (after 5 minutes) | 72 | |

Maximum torque (after 5 minutes) 72

The polymer is press-cured, into O-ring and sheet shapes, at 170° C. for 10 minutes, under an initial pressure 2.5 MPa and an end pressure 17.5 MPa, and is submitted to a 24-hrs postcuring at 250° C., with gradual temperature increase from 100° C. in 8 hrs.

| 100% Modulus | (1) | 5.3 MPa |
|---|---|---|
| Ultimate tensile strength | (1) | 17.0 MPa |
| Ultimate elongation | (1) | 21.0% |
| Hardness | (2) | 72.0 Shore A |
| Compression set (O-ring) | (3) | 38.0% |

(1) ASTM D 412-80
(2) ASTM D 1415-81
(3) ASTM D 395-78

| Change in 100% Modulus | 0% |
|---|---|
| Change in ultimate tensile strength | −11% |
| Change in ultimate elongation | −18% |
| Change in hardness | −1 Shore A |

What is claimed is:

1. Process for the preparation of curable fluoroelastomers comprising reacting from 35 to 80 mol % of vinylidene fluoride, from 15 to 35 mol % of hexafluoropropene, from 0 to 30 mol % of another comonomer selected from fluoroolefins and/or perfluorovinyl ethers and from 0.01 to 1 mol % of a brominated fluorovinyl ether having general formula:

$$CF_2Br\text{---}(R_f)_n\text{---}O\text{---}CF=CF_2$$

wherein $R_f$ is a fluorinated alkylene radical containing from 1 to 9 carbon atoms and n can be either 0 or 1, in the presence of a known polymerization initiator for fluoroelastomers, and of a chain-transfer agent having general formula:

$$R\text{---}(CF_2Br)_m$$

wherein m is either 1 or 2; when m is 1, R can be either bromine or a perfluoroalkyl radical of 2 to 4 carbon atoms containing a bromine atom bonded to a secondary carbon atom; and when m is 2, R is an alkylene radical of up to 4 carbon atoms containing a bromine atom bonded to a secondary carbon atom.

2. Process for the preparation of curable fluoroelastomers according to claim 1, wherein the brominated fluorovinyl ether is $CF_2Br\text{---}CF_2\text{---}O\text{---}CF=CF_2$.

3. Process for the preparation of curable fluoroelastomers according to claims 1 and 2, wherein the chain-transfer agent is used in an amount comprised within the range of from 0.001 to 1 mol %, relatively to the total component mol.

4. Process for the preparation of curable fluoroelastomers according to any of preceding claims, wherein the chain-transfer agent is $CF_2Br_2$.

5. Process for the preparation of curable fluoroelastomers according do any of preceding claims, wherein the fluoroolefins are selected among tetrafluoroethylene, chlorotrifluoroethylene and vinyl fluoride.

6. Process for the preparation of curable fluoroelastomers according to any of preceding claims, wherein the perfluorovinyl ethers are seclected from perfluoropropylvinyl ether, perfluoroethylvinyl ether and perfluoropropylvinyl ether.

7. Curable brominated fluoroelastomer constituted:
(A) by 35 to 80 mol % of units deriving from vinylidene fluoride monomers;
(B) by 15 to 35 mol % of units deriving from hexafluoropropene units;
(C) by 0 to 30 mol % of units deriving from monomers selected among fluoroolefins and/or perfluorovinyl ethers;
(D) by 0.01 to 1 mol % of units deriving from monomers of a brominated fluorovinyl ether having general formula $$CF_2Br\text{---}(R_f)_n\text{---}O\text{---}CF=CF_2$$

wherein $R_f$ is a fluorinated alkylene radical containing from 1 to 9 carbon atoms and n can have a value of either 0 or 1; wherein bromine is exclusively contained as —$CF_2Br$ groups and, in minor amount, as —$CH_2Br$ groups, and characterized in that it does not contain bromine atoms bonded in polymer chain to secondary carbon atoms.

8. Curable fluoroelastomer according to claim 7, wherein the fluoroolefins are selected among tetrafluoroethylene, chlorotrifluoroethylene and vinyl fluoride.

9. Curable fluoroelastomer according to claims 7 and 8, wherein perfluorovinyl ethers are selected among perfluoromethylvinyl ether, perfluoroethylvinyl ether and perfluoropropylvinyl ether.

* * * * *